United States Patent [19]
Loutfy et al.

[11] Patent Number: 4,459,274
[45] Date of Patent: Jul. 10, 1984

[54] CHLORINATION USING PARTIALLY CALCINED CARBONACEOUS MATERIAL AS A REDUCTANT

[75] Inventors: Raouf O. Loutfy; James C. Withers; Subodh K. Das; Samuel S. Jones, all of Tucson, Ariz.

[73] Assignee: Atlantic Richfield Company, Los Angeles, Calif.

[21] Appl. No.: 436,676

[22] Filed: Oct. 25, 1982

[51] Int. Cl.³ .............................................. C01F 7/60
[52] U.S. Cl. .................... 423/496; 423/136; 423/137; 423/461
[58] Field of Search ............... 423/136, 137, 496, 497, 423/461, 79, 60, 134, 343, 292, 62, 168, 155, 341, 491, 492

[56] References Cited

U.S. PATENT DOCUMENTS

| | | | |
|---|---|---|---|
| 3,755,099 | 8/1973 | Haupin | 204/64 R |
| 3,937,786 | 2/1976 | Nemecz et al. | 423/496 |
| 4,073,872 | 2/1978 | Willhoft | 423/496 |
| 4,135,994 | 1/1979 | Ishikawa et al. | 204/67 |
| 4,182,747 | 1/1980 | Gravey et al. | 423/60 |
| 4,244,935 | 1/1981 | Dell | 423/491 |
| 4,264,569 | 4/1981 | Sinha | 423/495 |
| 4,284,607 | 8/1981 | Culleiton et al. | 423/137 |

FOREIGN PATENT DOCUMENTS 2829739  1/1980  Fed. Rep. of Germany ...... 423/496

*Primary Examiner*—Earl C. Thomas
*Assistant Examiner*—Jeffrey E. Russel

[57] ABSTRACT

An improved solid carbon reductant comprising partially calcined carbonaceous materials such as petroleum coke, containing relatively low amounts of residual hydrocarbons and a relatively high surface area and thus increased activity as compared to known reductants is provided. This improved reductant is produced by a method comprising heating the carbonaceous material in an oxidizing atmosphere to a temperature of from about 650° C. to about 950° C., preferably from about 800° C. to about 875° C., and most preferably at a temperature about 850° C. In addition, according to the present invention improved chlorination processes are provided using these reductants which result in reduced levels of chlorinated hydrocarbon ($C_xCl_y$) production due to reduced residual hydrocarbons. In a preferred embodiment anhydrous aluminum chloride is produced by chlorination of aluminum hexahydrate using the improved reductant.

22 Claims, No Drawings

CHLORINATION USING PARTIALLY CALCINED CARBONACEOUS MATERIAL AS A REDUCTANT

BACKGROUND OF THE INVENTION

1. Field of Invention

This invention relates to reductive chlorination processes, and, in particular, to a method of producing an improved solid carbonaceous reductant whose use results in substantially decreased levels of environmentally unacceptable chlorinated hydrocarbons ($C_xCl_y$), such as polychlorinated biphenyl (PCB), and hexachlorobenzene (HCB) in metal chlorides such as aluminum chloride produced therefrom.

2. Description of the Prior Art

The rate of carbon consumption is an important factor in a number of metallurgical processes. For example, in the production of anhydrous aluminum chloride, from aluminous raw material, as a precursor for producing aluminum, carbon or carbon monoxide is used as a reductant according to the following equations:

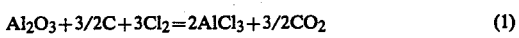

$$Al_2O_3 + 3/2C + 3Cl_2 = 2AlCl_3 + 3/2CO_2 \quad (1)$$

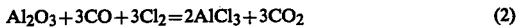

$$Al_2O_3 + 3CO + 3Cl_2 = 2AlCl_3 + 3CO_2 \quad (2)$$

The rate of reaction (2) is significantly higher than reaction (1). However, the use of carbon monoxide as a reductant in reaction (2) requires the generation of carbon monoxide from carbon. Thus, for either chlorination reaction, the activation of carbon is desirable to both increase the rate and/or lower the reaction temperature. Carbon monoxide as a reductant results in a rapid chlorination rate and produces an AlCl$_3$ product with essentially no environmental contaminants such as chlorinated hydrocarbons including polychlorinated biphenyls (PCB's) or hexachlorobenzene (HCB), decachlorobiphenyl (DCBP), pentachbrobenzonitrile (PCBN), pentachloropyridine (PCP) and octachlorostyrene (OCS). Its cost, however is site dependent. Moreover, use of CO requires a mole ratio C/Al$_2$O$_3$ of 3 which translates to about 0.67 lb C/lb Al and requires a significant gas volume to be handled resulting in higher capital cost. Solid reductants can result in stable cost regardless of site location and can result in lower off-gas volume depending on chlorination temperature.

Petroleum coke is a known source for solid carbon reductants for the chlorination of aluminous materials, such as partially calcined alumina (PCA), metal grade alumina (MGA) and partially calcined aluminum chloride hexahydrate (ACH). Green petroleum coke, i.e., uncalcined coke, is known to have a moderate level of activity. However, a serious disadvantage is that it contains significant quantities of hydrogen and hydrocarbons which are chlorinated during the chlorination process. Not only does their presence result in increased consumption of expensive unrecoverable chlorine, but the hydrogen and hydrocarbons interfere with the chlorination reaction kinetics due to their vapor pressure over the surface of the solid reductant. Calcining coke drives off the hydrogen and hydrocarbons but to a great extent also deactivates the carbon. Fully calcined coke, i.e., coke calcined at about 1200°–1400° C., has very low activity insofar as chlorination reaction kinetics are concerned, but is essentially free of excess hydrogen and hydrocarbons. Accordingly, methods of activating partially and fully calcined coke have been sought after for some time.

Petroleum coke is normally fully calcined to 1200°–1400° C. (FCC) to remove moisture and volatiles. The high temperature for calcination of coke is essential for use in aluminum chloride production since low temperature calcined coke contains residual hydrocarbons and hydrogen that can be converted, during chlorination, to environmentally unacceptable chlorinated hydrocarbon products, such as PCB's. However, the high temperature calcination of coke, sometimes called dead burning, produces coke with a low surface area and low activity.

An alternative to both carbon monoxide and fully calcined coke (FCC) is the use of traditional partially calcined coke (PCC) as taught and described in U.S. Pat. No. 4,284,607. This known method of producing partially calcined coke involves subjecting green petroleum coke in a nitrogen or non-oxidizing atmosphere to a calcination temperature of from 650° C. to 900° C. and preferably 850° C. for a time period of 10 to 120 minutes, preferably 30 minutes. Typically, the calcination, alone or in conjunction with the aluminous materials to be chlorinated, is performed in a fluidized bed with nitrogen as the fluidizing agent or fluidization gas.

Traditional partially calcined coke (PCC), such as that of U.S. Pat. No. 4,284,607, is a relatively active reductant which results in rapid chlorination of aluminous materials such as metal grade alumina (MGA) to produce anhydrous aluminum chloride. However, a serious disadvantage of partially calcined coke presently known and used as a reductant for chlorination reactions is that it contains relatively high levels of residual hydrocarbons. During chlorination utilizing such partially calcined coke as the reductant, the residual hydrocarbons will also be chlorinated to produce environmentally harmful hydrocarbons such as polychlorinated biphenyls (PCBs), hexachlorobenzene (HCB), decachlorobiphenyl (DCBP), pentachlorobenzonitrile (PCBN), pentachloropyridine (PCP), and octachlorostyrene (OCS).

Accordingly, a highly desirable and heretofore unknown solid carbon reductant would be one with the relative activity of known or traditional partially calcined coke but without the disadvantages present due to residual hydrocarbons which produce unacceptable chlorination products.

SUMMARY OF THE INVENTION

According to the present invention an improved solid carbon reductant comprising partially calcined carbonaceous material such as petroleum coke containing relatively low amounts of residual hydrocarbons and a relatively high surface area and thus increased activity as compared to known reductants is provided. This improved reductant is produced by a method comprising heating green petroleum coke in an oxidizing atmosphere to a temperature of from about 650° C. to about 950° C., preferably from about 800° C. to about 875° C. and most preferably at a temperature about 850° C. In addition, according to the present invention improved chlorination processes are provided using these reductants which result in reduced levels of chlorinated hydrocarbon ($C_xCl_y$) production due to reduced residual hydrocarbons.

DETAILED DESCRIPTION OF THE INVENTION

The production of aluminum via aluminum chloride electrolysis has the potential of significant savings in energy consumption over presently used processes. However, the production of anhydrous aluminum chloride from aluminous raw material is a critical problem step. Low temperature and high rate of chlorination are the essential elements for economically acceptable chlorination processes. While green petroleum coke which has been partially calcined by known methods, i.e., in an inert atmosphere or under its own vapor pressure, meets these requirements when used as the reductant for chlorination of aluminous materials, it also results in the production of unacceptable levels of environmentally harmful chlorinated hydrocarbons. Partial calcination of green petroleum coke according to the present invention offers the possibility of an economically advantageous solid carbon reductant with the added advantage of acceptably low levels of polychlorinated hydrocarbons produced during chlorination.

Partially calcined carbonaceous reductant prepared according to the present invention is heated or roasted in an oxidizing atmosphere. By an oxidizing atmosphere is meant that the calcination is carried out in air, oxygen, ozone or combinations thereof, e.g., as the fluidizing gas in a fluidized bed reactor, or in a rotary kiln, or alternatively, that calcination is in the presence of known oxidizing agents such as peroxides ($H_2O_2$) or oxidizing mineral acids, such as $HNO_3$. In the preferred embodiment air, oxygen ozone, or mixtures thereof are used, typically at flow rates of air from about 5 cc/g reductant/min to about 15 cc/g reductant/min (about 200 to about 600 cc/min) and less for pure oxygen, e.g., about ½ to about 2 cc/gram reductant/min (about 25 to about 100 cc/min) preferably about 1 cc per gram reductant/min (50 cc/min) and mixtures thereof.

Calcination according to the present invention is at a temperature of from about 650° C. to about 950° C., preferably about 800° C. to about 875° C. and most preferably at or about 850° C. Preferably, calcination is for a time period sufficient to oxidize substantially all precursors that would lead to chlorinated hydrocarbon formation and/or to etch the carbon to a surface area greater than about 2 $m^2$/g and less than about 100 $m^2$/g, typically from about 10 minutes to about 2 hrs, more typically from about 15 to about 60 minutes.

Aluminous materials advantageously chlorinated in the presence of the partially calcined coke of the present invention include aluminum chloride hexahydrate, alumina, bauxite, clay or other aluminum-bearing materials, such as fly ash. Other metal and metalloid oxides which can also be advantageously chlorinated in the presence of the partially calcined coke of the present invention include $TiO_2$, $MgO$, $MoO_3$, $WO_3$, $Ta_2O_5$, $BeO$, $B_2O_3$, $ZrO_2$, $HfO_2$, $Nb_2O_5$, $SiO_2$ and the like. The metal chlorides produced will be substantially free of environmentally unacceptable chlorinated hydrocarbons.

Carbonaceous material used in the present invention may be coke, typically petroleum coke, treated coal, char and the like or mixtures thereof. The petroleum coke may be fluid or delayed petroleum coke. "Delayed coke" refers to the product of a particular well known coking process as described in U.S. Pat. No. 4,284,607 in which formation of coke is delayed until it reaches the coke drum.

In a preferred embodiment, aluminum chloride hexahydrate (ACH) is the aluminous material and is derived by acid leaching of clay or other aluminum bearing material. In another preferred embodiment the ACH is single-stage crystallized ACH prepared and calcined according to the method of copending U.S. Ser. No. 400,310, filed July 21, 1982, incorporated herein by reference. Acid leach-derived ACH may be partially calcined at temperatures of from about 200° C. to about 900° C., preferably about 450° C. to about 750° C., and then chlorinated in the presence of the reductant of the present invention. Chlorination is typically carried out at temperatures of from about 500° C. to about 950° C. and pressures from about 0.1 atm to about 15 atms. In the preferred embodiment chlorination is effected in a fluidized bed reactor using chlorine gas as the fluidizing gas.

Anhydrous aluminum chloride prepared by chlorination according to the present invention is advantageously utilized in electrolytic cells for production of aluminum. The electrolysis is typically conducted in standard closed monopolar cells or in bipolar cells such as described in U.S. Pat. No. 3,755,099 and U.S. Pat. No. 4,135,994.

The following examples are provided by way of illustration and not by way of limitation.

EXAMPLE 1

Twelve (12 gms) of ACH partially calcined at 650° C. obtained from the acid leach of clay was reductively chlorinated at 550° C. for 30 minutes in a one-inch diameter fluidized bed reactor using chlorine gas as the chlorinating agent and 3 gms of each of the following as the reductant:

(a) Partially calcined coke prepared by calcining 50 gms of Collier green coke obtained from Union Oil Company (−100 mesh size) at 650° C. in a rotary kiln for 30 minutes in a nitrogen atmosphere.

(b) Partially calcined coke according to the present invention prepared by calcining a second sample of the green petroleum coke of (a) at 650° C. for 30 minutes in a rotary kiln with a 15 cc/g coke/min flow of air.

(c) Partially calcined coke according to the present invention prepared by calcining as in (b) above but at 850° C. for 30 minutes in a rotary kiln with an air flow of 15 cc/g coke/min.

(d) Fully calcined Collier coke as in (a) above, calcined to 1300° C.

(e) Carbon monoxide at a flow of 55 cc/min.

The levels of total chlorinated hydrocarbons and the chlorination rates are provided in Table I.

TABLE I

| Reductant | Total Chlorinated Hydrocarbon Levels (ppm) | Chlorination Rate (gm $AlCl_3$ min) |
|---|---|---|
| (a) | 2778 | 0.090 |
| (b) | 199 | 0.085 |
| (c) | less than 3 | 0.10 |
| (d) | 45 | 0.039 |
| (e) | 3 | 0.095 |

From the results of the above example it can be seen that partially calcining green coke under an oxidizing atmosphere substantially reduces the level of chlorinated hydrocarbons in the final product as compared to partial calcination of coke under an inert atmosphere. The data shows that using fully calcined coke results in low levels of chlorinated hydrocarbons, but that the use of fully calcined coke is associated with a low chlorination rate (0.039 gm $AlCl_3$/min) as compared to the use of partially calcined green coke of 0.085 to 0.1 gm $AlCl_3$/min. It is also clear that using CO as reductant results simultaneously in high chlorination rates with very low levels of chlorinated hydrocarbons.

EXAMPLE 2

Aluminous material as described in Example 1 was reductively chlorinated at 650° C. for 30 minutes in a fluidized bed reactor using chlorine as the chlorinating agent and each of the following as the reductant:

(a) Partially calcined coke prepared by calcining 50 gms of Collier green coke obtained from Union Oil Company (−100 mesh size) at 750° C. in a rotary kiln for 60 minutes in a nitrogen atmosphere.

(b) Partially calcined coke according to the present invention prepared by calcining a second sample of the same green petroleum coke at 750° C. for 60 minutes in a rotary kiln with 200 cc/min air flow rate.

(c) Partially calcined coke according to the present invention prepared by calcining a sample of the same green petroleum coke at 750° C. for 60 minutes in a rotary kiln with 600 cc/min air flow rate.

The levels and breakdown of chlorinated hydrocarbons determined to be in the $AlCl_3$ are provided in Table II.

TABLE II

| Reductant | Chlorinated Hydrocarbons in $AlCl_3$ (ppm) | | | | | |
|---|---|---|---|---|---|---|
| | HCB | DCBP | PCBN | PCP | OCS | Total |
| (a) | 48 | 2 | 420 | 360 | 560 | 1390 |
| (b) | 21 | 0 | 2.5 | 2 | 0 | 25.5 |
| (c) | 4 | 0 | 0 | 0 | 0 | 4 |

HCB = Hexachlorobenzene
DCBP = Decachlorobiphenyl
PCBN = Pentachlorobenzonitrile
PCP = Pentachloropyridine
OCS = Octachlorostyrene

EXAMPLE 3

Aluminous material as in Example 2 was reductively chlorinated under the same conditions as in Example 2 using coke partially calcined for 60 minutes at temperatures ranging from 750° C. to 950° C. with air flow rates of from 5 to 15 cc/g coke/min. The total levels of chlorinated hydrocarbons in the product $AlCl_3$ are provided in Table III.

TABLE III

| Reductant Calcination Temp. °C. | Total Chlorinated Hydrocarbons in $AlCl_3$ ppm | |
|---|---|---|
| | 5 cc/g coke/min | 15 cc/g coke/min |
| 750 | 26 | 4 |
| 800 | 94 | 0.3 |
| 850 | 105 | 21 |
| 875 | 48 | 5 |
| 950 | 64 | 4 |

The data shows that calcining green petroleum coke at temperatures greater than or equal to 750° C. with 200 cc/min (5 cc/g coke/min) flow of air results in 105 ppm chlorinated hydrocarbons or less in the final product. Calcining green petroleum coke at temperatures greater than or equal to 750° C. with 600 cc/min (15 cc/g coke/min) air flow results in less than or equal to about 21 ppm chlorinated hydrocarbons in the $AlCl_3$ products. The choice is thus between optimum temperature and flow rate of air as a function of the desired levels of chlorinated hydrocarbons and the total weight loss of carbon during the partial calcination under oxidizing atmosphere. The weight loss of green petroleum coke as a function of calcining temperature is provided in Table IV.

TABLE IV

| Reductant Calcination Temp. °C. | Percent increase in weight loss during calcination due to oxidizing atm treatment | |
|---|---|---|
| | 5 cc/g coke/min | 15 cc/g coke/min |
| 750 | 8 | 12 |
| 800 | 9 | 13 |
| 850 | 7 | 16 |
| 875 | 10 | 17 |
| 950 | 11 | 21 |

EXAMPLE 4

(a) The relative chlorination rate from the above experiments where coke was mixed with alumina (partially calcined ACH, calcined at 625° C.) in ratios of 20% carbon to 80% alumina are provided in Table V. An amount equal to 15 gm of the mixture was chlorinated in a fluidized bed reactor at 650° C. using chlorine gas.

TABLE V

| Calcination Temp. °C. | Relative Chlorination Rate gm $AlCl_3$/min Air Treated |
|---|---|
| 750 | 0.10 |
| 800 | 0.11 |
| 850 | 0.12 |
| 875 | 0.11 |

There appears to be an optimum chlorination rate when using partially calcined green petroleum coke calcined at about 800°–875° according to the present invention. Moreover according to the present invention a high chlorination rate is achieved in the temperature range of 750° to 875° C.

EXAMPLE 5

Fifty (50) gm batches of green petroleum coke (ground to −100 mesh) were calcined for approximately 30 minutes in a rotary kiln under an atmosphere of nitrogen, i.e., 200 cc/min nitrogen flow rate, at temperatures of 650° C., 850° C. and 900° C. The partially calcined green petroleum coke had the following analysis:

TABLE VIA

| Calcination Temp. °C. | Surface Area $m^2$/gm | Residual Hydrogen wt % |
|---|---|---|
| 650 | 2.3 | 2.13 |
| 850 | 2 | 0.52 |
| 900 | 2 | 0.30 |

Similarly, calcination of green petroleum coke was conducted as described above, but under an oxidizing atmosphere (200 cc air/min). The results of the analysis are as follows:

TABLE VIB

| Calcination Temp °C. | Surface Area $m^2$/gm | Residual Hydrogen wt % |
|---|---|---|
| 650 | 18 | 1.90 |
| 850 | 9.7 | 0.38 |
| 900 | 28.9 | 0.24 |

It is clear from a comparison of Tables VIA and VIB that coke which has been partially calcined in air as the oxidizing atmosphere has substantially higher surface area with reduced residual hydrogen levels.

EXAMPLE 6

The levels of chlorinated hydrocarbon in the AlCl$_3$ products from the above experiments, starting with 400° C. calcined ACH, were analyzed and the results are as follows:

| Coke Calcination Temperature °C. | Total Chlorinated Hydrocarbon Levels in ppm in AlCl$_3$ | |
|---|---|---|
| | Air Treated Coke | Nitrogen Treated Coke |
| 650 | 367 | 1365 |
| 850 | 105 | ND* |
| 900 | 116 | 1041 |

*ND = Not Determined

It is clear that (i) use of coke calcined in air according to the present invention results in a substantial reduction of chlorinated hydrocarbon levels in the final AlCl$_3$ product and (ii) there is an optimum calcination temperature where the chlorinated hydrocarbon levels drop to very low levels (i.e., about 850° C.).

EXAMPLE 7

The procedure of Example 1 (d) was followed except that the fully calcined coke was further calcined at 850° C. for 30 minutes in a rotary kiln with 600 cc/min flow of air. The levels of chlorinated hydrocarbon in the product AlCl$_3$ were found to be 35 ppm as compared to 45 ppm in Example 1 (d) wherein untreated fully calcined coke was used. Even though these levels are considered low, the percentage decrease of chlorinated hydrocarbons due to the air treatment is not comparable as compared to the air-treated green petroleum coke of Examples 2 (b) and (c) compared to Example 1(a).

EXAMPLE 8

The procedure of Example 2 was carried out but calcination of green petroleum coke was performed using 50 cc of oxygen. The level of total chlorinated hydrocarbons measured was 3 ppm.

Although the foregoing invention has been described in some detail by way of illustration and example for purposes of clarity and understanding, it will be obvious that certain changes and modifications may be practiced within the scope of the invention, as limited only by the scope of the appended claims.

What is claimed is:

1. A method of producing chlorides by the chlorination of a material selected from the group consisting of aluminous materials and metal and metalloid oxides in the presence of a reductant comprising:
   (a) calcining coke containing volatile hydrogen and hydrocarbons in an oxidizing atmosphere at a temperature of from about 650° C. to about 950° C. for a time period sufficient to oxidize substantially all precursors of chlorinated hydrocarbons and to form a reductant; and
   (b) chlorinating a material selected from the group consisting of aluminous materials and metal and metalloid oxides in the presence of said reductant formed in step (a).

2. A method according to claim 1 wherein the aluminous material is selected from the group consisting of aluminum chloride hexahydrate, alumina, bauxite, clay and flyash.

3. A method according to claim 2 wherein the aluminous material is aluminum hexahydrate which has been calcined at a temperature of from about 450° C. to about 750° C.

4. A method according to claim 1 wherein said metal and metalloid oxides are selected from the group consisting of Al$_2$O$_3$, TiO$_2$, MgO, MoO$_3$, WO$_3$, Ta$_2$O$_5$, BeO, B$_2$O$_3$, ZrO$_2$, HfO$_2$, Nb$_2$O$_5$, SiO$_2$ and mixtures thereof.

5. A method according to claim 1 wherein said time period is from about 30 minutes to about 2 hours.

6. A method according to claim 1 wherein said temperature is from about 750° C. to about 950° C.

7. A method according to claim 6 wherein said temperature is from about 800° C. to about 875° C.

8. A method according to claim 1 wherein said calcining is in the presence of an oxidizing agent selected from the group consisting of peroxides and oxidizing mineral acids.

9. A method according to claim 1 wherein said calcining is in the presence of an atmosphere selected from the group consisting of air, oxygen and mixtures thereof.

10. A method according to claim 9 wherein said coke has been calcined in a fluidized bed reactor wherein the fluidizing gas is selected from the group consisting of air, oxygen and mixtures thereof.

11. A method according to claim 10 wherein said fluidizing gas is air and is present in an amount of from about 5 cc/g coke/min to about 15 cc/g coke/min.

12. A method according to claim 10 wherein said gas is oxygen and is present in an amount of about 0.5 to about 2 cc/g coke/min.

13. A method according to claim 1 wherein said reductant has a surface area greater than about 2 m$^2$/g.

14. A method according to claim 13 wherein said surface area is from about 2 m$^2$/g to about 100 m$^2$/g.

15. A method according to claim 1 wherein said chlorined hydrocarbons are selected from the group consisting of polychlorinated biphenyls, hexachlorobenzene, decachlorobiphenyl, pentachlorobenzonitrile, pentachloropyridine, octachlorostyrene and mixtures thereof.

16. A method according to claim 1 wherein said coke is petroleum coke.

17. A method according to claim 16 wherein said petroleum coke is delayed petroleum coke.

18. A method according to claim 16 wherein said petroleum coke is fluid petroleum coke.

19. A method of producing anhydrous aluminum chloride by the chlorination of aluminous material in the presence of a reductant comprising coke originally containing volatile hydrogen and hydrocarbons which has been calcined in an oxidizing atmosphere at a temperature of from about 650° C. to about 950° C. for a time period sufficient to oxidize substantially all precursors of chlorinated hydrocarbons.

20. A method according to claim 19 wherein said coke has been calcined in a fluidized bed reactor wherein the fluidizing gas is selected from gases comprising air, oxygen and mixtures thereof.

21. A method according to claim 20 wherein the aluminous material is aluminum hexahydrate which has been calcined at a temperature of from about 450° C. to about 750° C.

22. In a method of producing metal and metalloid chlorides by chlorination of a metal and metalloid oxide-containing material in the presence of a solid reductant the improvement comprising using as said reductant coke originally containing volatile hydrogen and hydrocarbons which has been calcined in an oxidizing atmosphere at a temperature of from about 650° C. to about 950° C. for a time period sufficient to minimize production of chlorinated hydrocarbons.

* * * * *